United States Patent [19]

Klaeser et al.

[11] Patent Number: 4,838,982
[45] Date of Patent: Jun. 13, 1989

[54] PATCH APPLICATOR VACUUM CYLINDER FOR WEB MATERIAL

[75] Inventors: Richard Klaeser; Glenroy G. Blatz, both of Kiel, Wis.

[73] Assignee: H.G. Weber & Co., Inc., Kiel, Wis.

[21] Appl. No.: 66,520

[22] Filed: Jun. 26, 1987

[51] Int. Cl.⁴ .................. B32B 31/00; B65H 3/64; B21B 31/08
[52] U.S. Cl. ......................... 156/520; 29/116.1; 29/121.1; 29/130; 156/552; 156/DIG. 39; 162/370; 271/112; 271/276
[58] Field of Search ....... 156/520, DIG. 31, DIG. 38, 156/519, 571, 540-542, 529, DIG. 20, DIG. 39, 301, 521, 552, 568, DIG. 33; 271/108, 196, 96, 112, 276; 226/95; 29/121.1-121.7, 130, 401.1, 116; 425/194; 101/375; 198/689.1; 162/369, 370, 372

[56] References Cited

U.S. PATENT DOCUMENTS

| | | | |
|---|---|---|---|
| 633,152 | 9/1899 | Perry | 29/130 |
| 1,696,755 | 12/1928 | Feybusch et al. | |
| 1,883,187 | 10/1932 | Weber | 29/130 |
| 2,033,849 | 3/1936 | Mudd | 156/571 X |
| 2,162,566 | 6/1939 | Shackleton | 156/519 |
| 2,601,984 | 7/1952 | Pope | 156/DIG. 31 |
| 2,958,365 | 11/1960 | Molins et al. | 156/552 X |
| 3,125,265 | 3/1964 | Warren et al. | 226/95 |
| 3,294,396 | 12/1966 | Staines | |
| 3,311,032 | 3/1967 | Lucas | 156/519 |
| 3,336,028 | 8/1967 | Schonmeier | 271/276 X |
| 3,431,830 | 3/1969 | Stovall | 83/343 X |
| 3,441,463 | 4/1969 | Buck | 156/301 |
| 3,533,618 | 10/1970 | Carstens | 271/96 X |
| 3,587,962 | 6/1971 | Herzhoff et al. | 226/95 |
| 3,707,422 | 12/1972 | Helm | 156/520 |
| 3,728,191 | 4/1973 | Wierzba et al. | 156/519 X |
| 3,884,460 | 5/1975 | Jiruse | |
| 3,916,790 | 11/1975 | Alix | |
| 3,957,570 | 5/1976 | Helm | 156/568 X |
| 4,059,470 | 11/1977 | Primavesi et al. | |
| 4,061,527 | 12/1977 | Traise | 156/519 |
| 4,207,998 | 6/1980 | Schmid | 271/196 |
| 4,299,223 | 11/1981 | Cronkrite | 156/300 |
| 4,390,174 | 6/1983 | Veith | |
| 4,451,029 | 5/1984 | Wildmann et al. | |
| 4,579,330 | 4/1986 | Lehmann | |
| 4,583,460 | 4/1986 | Maslin et al. | 29/130 X |
| 4,726,169 | 2/1988 | Achelpohl et al. | 493/217 X |

Primary Examiner—Michael W. Ball
Assistant Examiner—David W. Herb
Attorney, Agent, or Firm—Hill, Van Santen, Steadman & Simpson

[57] ABSTRACT

An applicator for applying patches to a traveling web, such as in a bag forming machine, includes a vacuum cylinder with an outer perforated sleeve, an inner slotted sleeve and a stationary core with shaped pressure chambers for applying patches cut from a roll to the traveling web. Cutting blades are included in the perforate outer sleeve to sever patch material from a roll as the vacuum cylinder rotates. The outer perforate sleeve is replaceable with sleeves of different outside diameters to accommodate different patch locations.

2 Claims, 6 Drawing Sheets

PATCH APPLICATOR VACUUM CYLINDER FOR WEB MATERIAL

BACKGROUND OF THE INVENTION

1. Field of the Invention

The present invention relates generally to an apparatus for applying first web portions in a predetermined pattern along a traveling second web.

2. Description of the Related Art

In general, it is known to pick up sheets of material by the use of a vacuum and then to deposit the sheets on a traveling web by means of positive air pressure.

SUMMARY OF THE INVENTION

An object of the present invention is to position and apply a first web portion to a traveling second web of material accurately and repeatably.

Another object of the invention is to provide a patch applicator apparatus which is easily adapted for different patch sizes and spacings.

A further object of the invention is to provide a single apparatus for cutting a patch of sheet material from a roll and then applying the patch to a traveling web at a predetermined location.

These and other objects of the invention are achieved in a patch applicator having a rotating perforated vacuum cylinder for shearing a predetermined amount of sheet material from a supply roll and for carrying the sheared portion of sheet material for placement at a predetermined location along a traveling web. The severed sheet material is held against the perforated cylinder by negative air pressure, and as the severed sheet is applied to the traveling web, the sheet material is released by the application of positive air pressure.

An outer portion of the perforated cylinder is interchangeable for applying patches with different spacings along the traveling web. Preferably, the vacuum cylinder includes three coaxial components, a first stationary core with positive and negative air pressure chambers, a second rotationally mounted, longitudinally slotted cylinder disposed over the first core, and a third perforated outer cylinder including one or more cutting blades. The outer cylinder is prefereably keyed for rotation with the second slotted cylinder. Positive and negative air pressure are applied by the stationary core member to the preforations in the outer member to define the location for the application of the negative and positive air pressures which carry and release, respectively, the patch. In this way, patches are applied along a traveling web of material.

The rotation of the vacuum cylinder is synchronized with the movement of the traveling web, as well as with other apparatus in the assembly line, so that the patches are applied accurately and repeatably. In one embodiment, the vacuum cylinder rotates at the rate of the traveling web, while the patch material is fed at a slower rate so that the patch material slips over the surface of the vacuum roller until a patch portion is cut from the web of patch material. After being cut, the patch portion is carried on the vacuum roller into contact with the traveling web.

A patch applicator according to the principles of the present invention may be used to apply film or foil patches to a traveling web of material, such as a paper web, and thereby avoids the need to line the entire paper web. The present device is suited for applying transparent film windows to envelope blanks and, in embodiment, is particularly useful in applying foil patches between inside and outside layers of bag-forming material at predetermined locations. The resulting bags with foil patch inserts are well suited for use in microwave cooking of foods, such as microwave popcorn, within the foil patch lies only under the food product.

DESCRIPTION OF THE PREFERRED EMBODIMENTS

Figure 1:
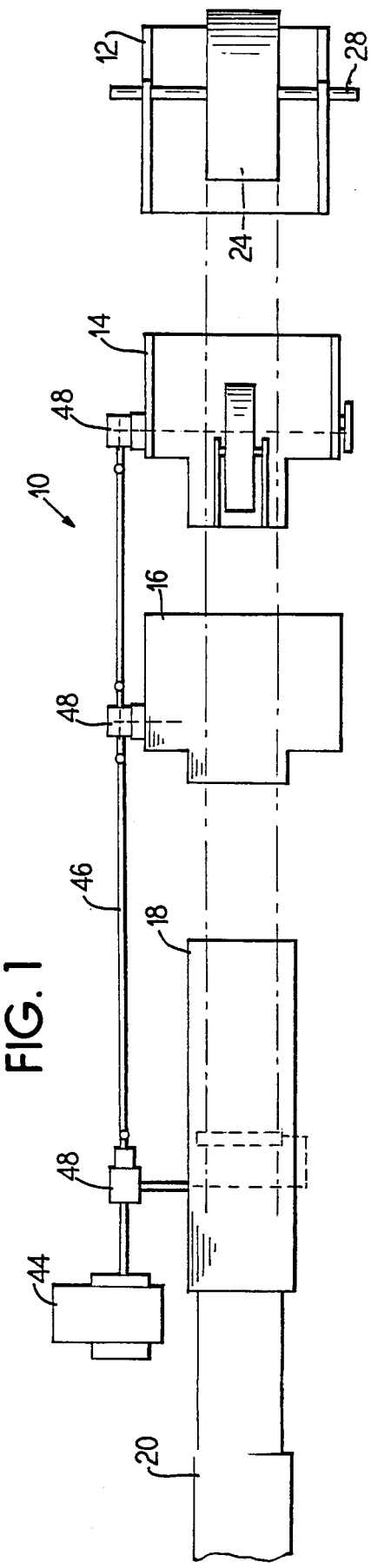
FIG. 1 is a plan view of a bag forming apparatus for synchronized operation, including a patch applicator for a traveling web according to the principles of the present invention.
Figure 2:
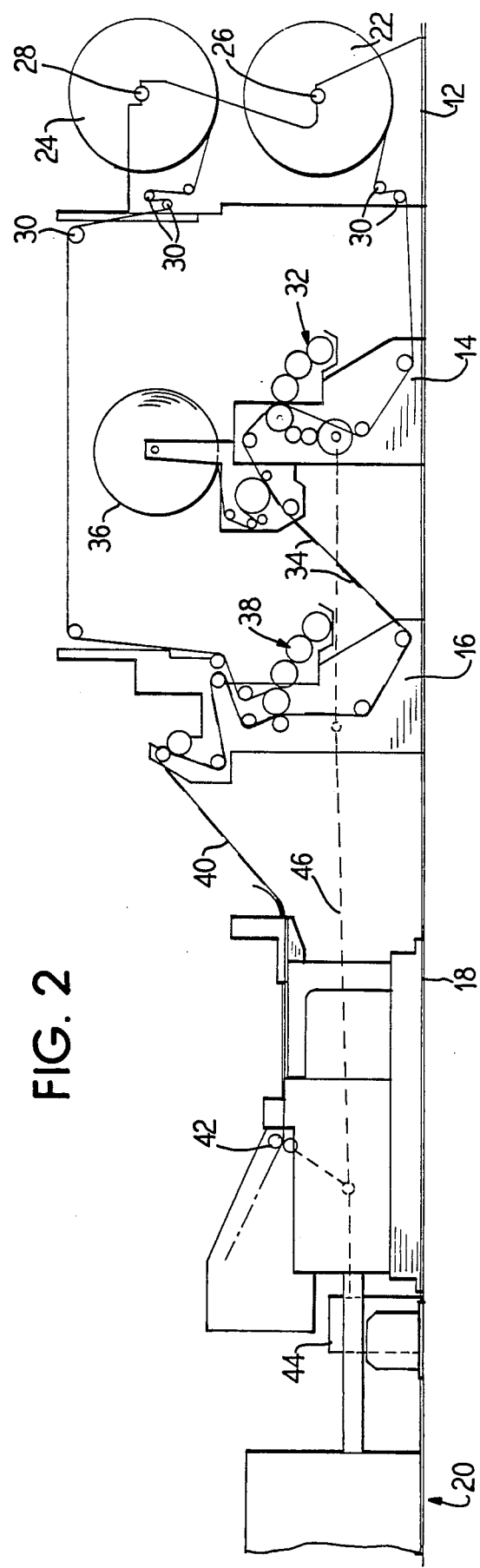
FIG. 2 is a side elevational view of the bag forming apparatus shown in FIG. 1.

An apparatus 10 for forming bags from continuous webs of material is shown in FIGS. 1 and 2, including a supply station 12, a patch applicator station 14, a laminator 16, a bag forming apparatus 18, and a stacking and bundling apparatus 20 all of which are in the form of an assembly line. The supply station 12 holds one or more supply rolls of web material from which the bags are formed, and in the illustrated embodiment, the supply station 12 rotationally it holds a first supply roll 22 of outer bag material and a second supply roll 24 of inner bag material. The supply rolls 22 and 24 are held on a pair of axles 26 and 28, respectively, and are thereby free to rotate thereabout. The web material from the rolls 22 and 24 is fed over a plurality of supply station rollers 30 to subsequent stations in the bag forming apparatus 10.

At the patch applicator station 14, an adhesive is applied to the outer bag material 22 by an adhesive applicator portion 32, after which patches 34 cut from a patch material roll 36 are applied to the outer bag material 22 over the adhesive. The inner bag material 24 bypasses the patch applicator station 14.

At the laminator station 16, an adhesive applicator portion 38 applies an adhesive to at least one of the inner and outer material webs 22 and 24 and then the two webs 22 and 24 are joined to one another, preferably with the patches 34 therebetween.

The bag forming apparatus 18 draws the laminated material 40, which includes the patches 34, thereinto and forms bags or other articles therefrom. The bag forming station 18 includes, in the illustrated embodiment, a pair of puller rollers 42 which supply tension to draw the inner bag material 24 and outer bag material 22 from their respective supply rolls.

After being formed into bags or the like, the stacker or bundling station 20 packages the formed articles for subsequent use or shipping.

The entire apparatus 10 is synchronized by the provision of a drive motor 44 operating a drive linkage 46 which connects the patch applicator station 14, the laminator station 16, and the bag forming station 18. A transmission 48 connects each of the stations 14, 16, and 18 to the drive linkage 46. Thus, the patch applicator station 14, the laminator station 16, and the bag forming station 18 all operate in synchronization.

Figure 3:
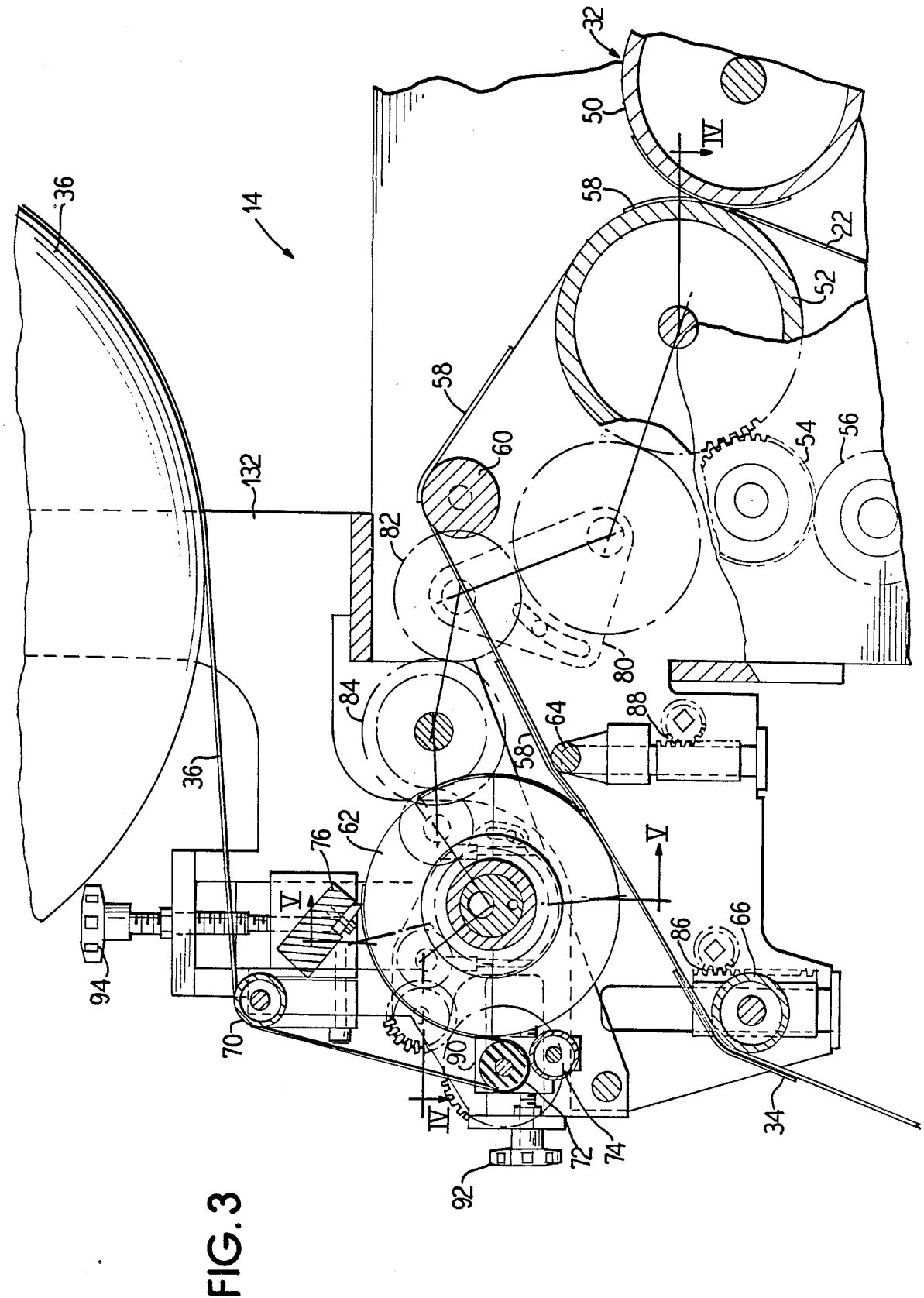
FIG. 3 is an enlarged fragmentary view, partially in cross section, of the patch applicator of FIG. 2.

Referring now to FIG. 3, a detailed view of the patch applicator station 14 is shown which applies the patches 34 cut from the roll of patch material 36 to the web of outer material 22. The outer web 22 moves upward through the patch applicator station 14 and between an adhesive applicator roller 50 and a driven roller 52. The driven roller 52 is rotated by a pair of reach gears 54 and 56, which in turn are driven through the drive linkage 46 and the transmission 48. The adhesive applicator roller 50 applies adhesive at spaced locations along the outer web 22, as indicated at 58. The area over which the adhesive 58 is applied preferably corresponds to the size and shape of the patches 34. The outer web 22 with the applied adhesive 58 moves over an idler roller 60 and toward a vacuum roller 62 which applies the cut patches 34 to the moving web 22. Adjustable rollers 64 and 66 ensure contact of the web 22 with the vacuum roller 62.

The material from the patch supply roll 36 is drawn therefrom and passes over an idler roller 70 and then around an adjustable pinch roller 72. The adjustable roller 72, in addition to a pinch roller 74 draws the web 36 from the roll and guides the patch web 36 onto the vacuum roller 62. Once on the vacuum roller 62, a cutter 76 cuts the patch web 36 into the desired lengths to form the patches 34. As can be seen, a variety of gears connect the driven rollers in a synchronized manner to ensure that the patches 34 are applied at the adhesive locations 58.

The present device is adjustable for use with various sizes of vacuum rollers to accommodate different patch sizes and patch spacings. For instance, a bracket 80 adjustably mounts a reach gear 82 which contacts a change-out gear 84 that is changed for other size gears depending upon the desired operation of the present device. When a different diameter vacuum roller 62 is mounted within the patch applicator 14, the adjustable rollers 64 and 66, as well as the pinch rollers 72 and 74, are moved to accommodate the different vacuum roller. For example, a ratchet and gear assembly 86 and a similar ratchet and gear assembly 88 are provided at the adjustable roller 66 and 64, respectively. By rotation of the gears, the rollers 64 and 66 are displaced vertically to align the path of the web 22 with the outer surface of the vacuum roller 62. The pinch rollers 72 and 74 are mounted on a block 90 which is adjustable by means of a rotatable knob 92 connected to a threaded shaft. Simularly, the cutter 76 is adjustable in position by a knob and threaded shaft assembly 94. The adjusting mechanisms are, of course, duplicated on each end of the rollers.

Figure 4:
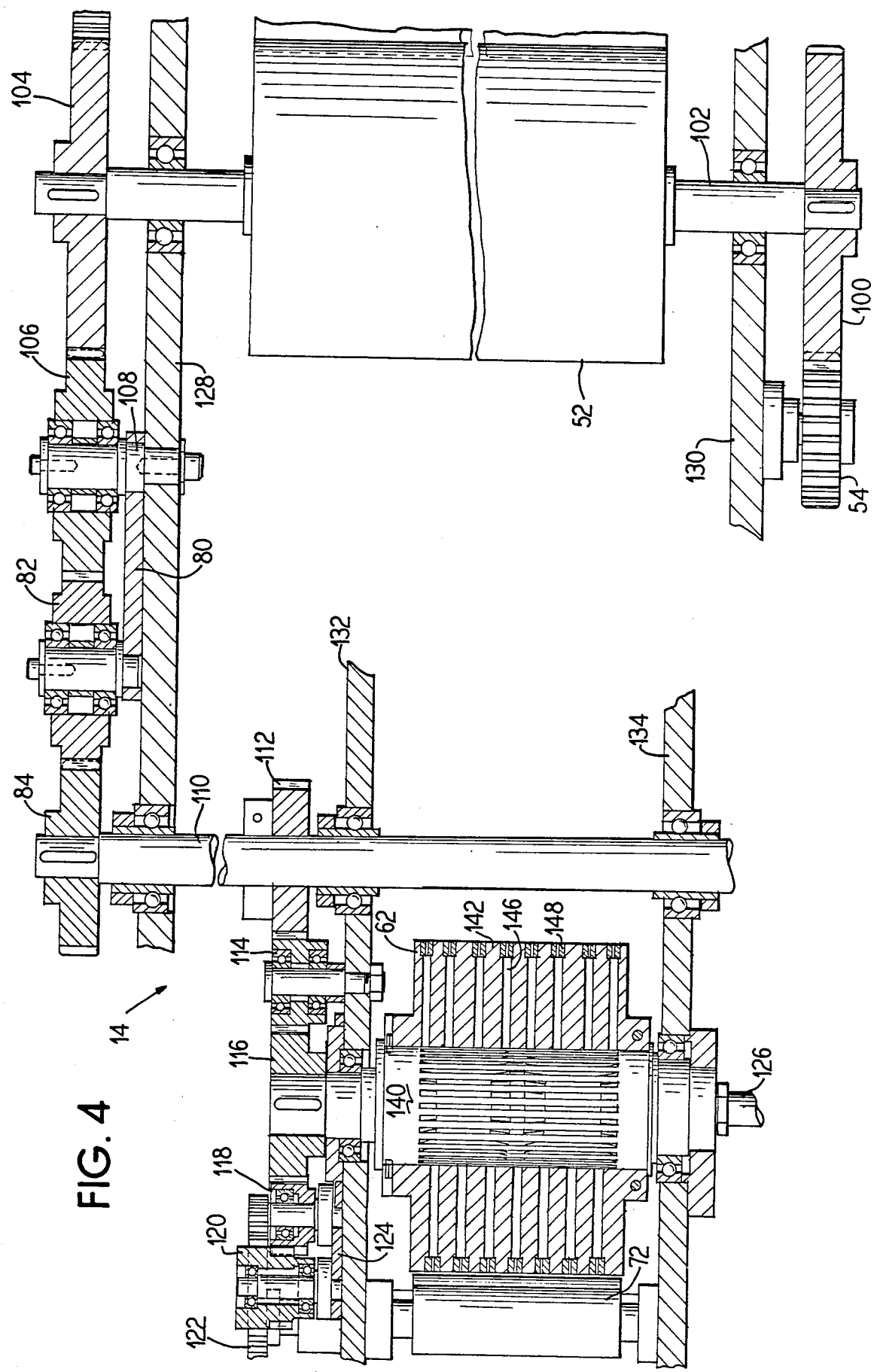
FIG. 4 is a cross section along line IV—IV of FIG. 3 showing the drive gear arrangement for the present patch applicator device.

In FIG. 4, is shown a cross section through the drive train of the patch applicator 14. In particular, the reach gear 54 through which operates the drive linkage 46 is connected to an oversized gear 100 that drives a shaft 102 on which the roller 52 is mounted. At the other end of the shaft 102 is a second oversized gear 104 which is interconnected with a step gear 106, that in turn is linked to the gear 82 on the bracket 80. The bracket 80 is mounted for rotation about a shaft 108 provided for the gear 106. The change-out gear 84 is driven by the gear 82 to rotate a shaft 110 which in turn drives the patch application machinery. The driven shaft 110, through a gear 112 rotates the link gear 114 which drives a vacuum roller gear 116 mounted for movement with the vacuum roller 62. A small idler gear 118 meshes with a gear 120 which engages a gear 122 that is mounted on an axle for turning the pinch rollers 72 and 74. The gears 118 and 120 are mounted on a bracket 124 which is pivotable about a shaft 126 of the vacuum roller 62 to provide for adjustment of the pinch rollers with respect to the vacuum roller 62. The gears and shafts are mounted for rotation by a pluarality of bearings in mounting plates 128, 130, 132, and 134 of the patch applicator station 14.

In the vacuum roller 62 can be seen a slotted inner cylinder or sleeve 140 and an outer cylinder 142 or sleeve, the outer sleeve 142 being provided with air channels 146 having nozzle tips 148 at the outside end of each air channel 146.

Figure 5:
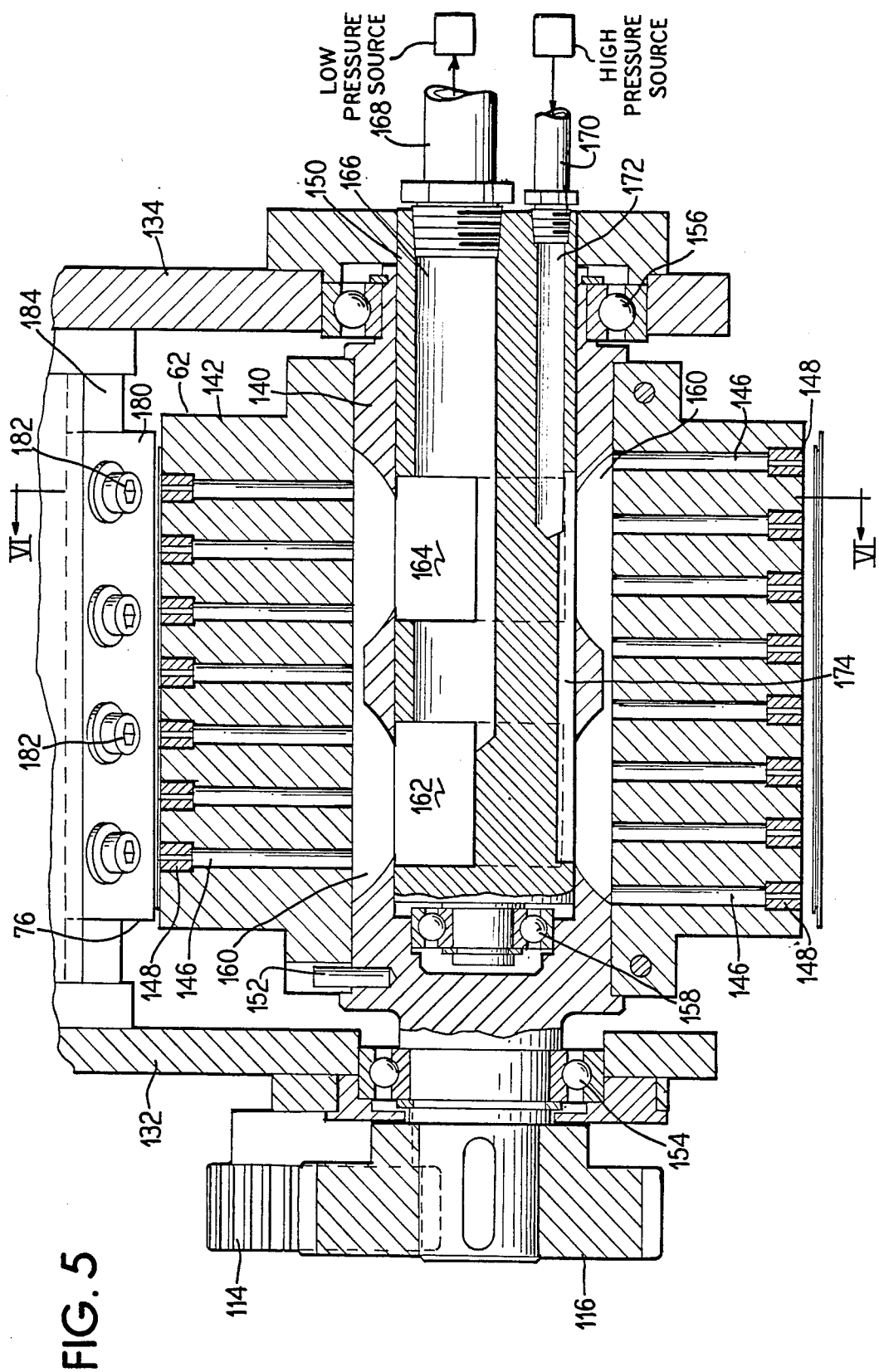
FIG. 5 is cross section along line V—V of FIG. 3 through a vacuum cylinder of the present invention.

A vertical cross section through the vacuum roller 62 is shown in FIG. 5. The vacuum roller 62 is formed by the outer perforate cylinder or sleeve 142, the inner slotted cylinder or sleeve 140, and an inner core 150 which is stationarily mounted with respect to the patch applicator station 14. The outer and inner sleeves 142 and 140 are keyed to one another by a key 152 so that they rotate together. Bearings 154 and 156 are provided between the rotating cylinders 140 and 142 and the mounting plates 132 and 134. Rotational bearings 158 are also provided between the slotted inner cylinder 140 and the stationary core 150.

Air flow paths are provided in the vacuum cylinder 62 for both low pressure and high pressure air. Low pressure air generates an air flow from the outside surface of the vacuum cylinder 62 through the nozzles 148 provided at the end of each of the air channels 146 in the perforate cylinder 142. The air then flows through shaped slots 160 in the slotted inner cylinder 140. The shaped slots 160 in the illustrated embodiment have a dual arcuate shape with an outermost portion in communication with all of the air channels 146 in a row. A pair of low pressure chambers 162 and 164 are provided in the inner core 150 in communication with respective ones of the arcuate shaped portions of the slot 160. The low pressure chambers 162 and 164 are joined to one another by a low pressure bore 166 of relatively large diameter extending from an end of the core 150 to both of the low pressure chambers 162 and 164. A conduit 168 is connected to a low pressure source, such as for generating a partial vacuum, as is known in the art. Likewise, a high pressure source is connected to a conduit 170 to feed a bore 172 of relatively small diameter extending into the core 150. The bore 172 is in communication with a small high pressure chamber 174, which directs air through the slots 160 in the slotted cylinder or sleeve 140 and then through the channels 146 in the perforate cylinder or sleeve 142. Thus, as the outer and inner sleeves 142 and 140 rotate about the core 150, the slots 160 and the air channels 146 are sequentially subjected to a low air pressure flow and a high air pressure flow.

The cutter assembly 76 is mounted extending along the outer surface of the perforate cylinder 142 and includes a blade 180 held by mounting bolts 182 in a mounting block 184.

Figure 6:
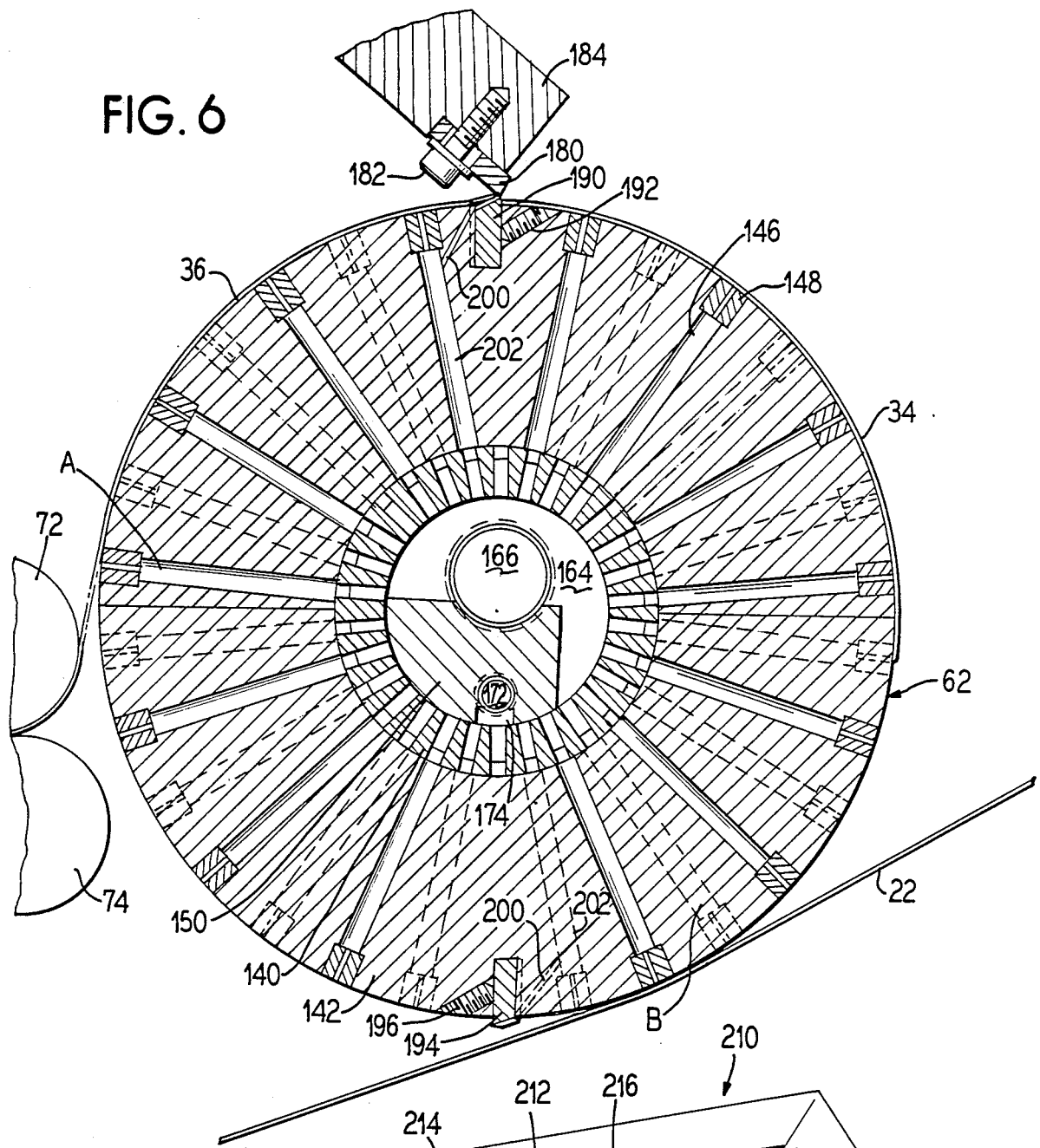
FIG. 6 is cross section along line VI—VI of the vacuum cylinder shown in FIG. 5.

With reference now to FIG. 6, the cutter blade 180 periodically contacts a complementary blade 190 mounted in the vacuum cylinder 162 to sever the patch material 36 into individual patches 34 as the vacuum cylinder 62 rotates. The blade 190 is held in place by plurality of set screws 192. A second blade 194 and a group of set screws 196 are also provided on the vacuum cylinder 62 in spaced opposition to the first blade 190. Thus, two patches 34 are cut at each revolution of the vacuum cylinder 62.

The application of low and high pressure air to the outer surface of the vacuum cylinder 62 is controlled by the shaped low pressure chambers 164 and 162 and by the high pressure chamber 174 provided in the stationary core 150. The low pressure chamber 164 and the low pressure chamber 162, located behind the chamber 164 in FIG. 6, cause a low pressure, or partial vacuum, to be applied across most of the circumference of the cylinder 62. In particular, low air pressure is first applied to the air flow channels 146 at a position A just as the patch web 36 encounters the vacuum cylinder 62. The partial vacuum is applied around the circumference of the cylinder 62 to a position B by the chambers arcuate extent of the 162 and 164. The position B corresponds approximately to the first contact of the vacuum cylinder 62 with the outer web 22.

The positive air pressure is likewise applied from the high pressure chamber 174 to the slotted cylinder 140 and outer cylinder 142 as they rotate therepast. The position of the high pressure chamber 174 enables high pressure air to flow through the air passages 146 to the surface of the vacuum cylinder 62 which is in contact with the web 22 just after. This aids the patch 34 in breaking contact with the cylinder 62. Thus, a low pressure or partial vacuum is present to hold the patch material 36 and the patches 34 against the vacuum cylinder 62 until the patches 34 encounter the traveling web 22. The high pressure air flow is transmitted through the air passageways 146 to ensure release of the patch 34 from the vacuum cylinder 62. In this way, the patches 34 are moved from the pinch rollers 72 and 74 and applied to the traveling web 22.

To ensure that the forward edge of the patch material 36 does not move away from the cylinder 62, an additional passageway 200 is provided extending from air passage ways 202 which follow behind the blades 190 and 194 in the rotational direction of the cylinder 62.

In operation, the vacuum cylinder 62 rotates at the feed rate of the traveling web 22, which is faster than the patch material 36 is fed from the pinch rollers 72 and 74, so that the patch material 36 slips over the surface of the vacuum cylinder 62. This causes the patches 34 cut from web 36 to have a lesser longitudinal extent than the spacing of the patches 34 on the traveling web 22.

Figure 7:
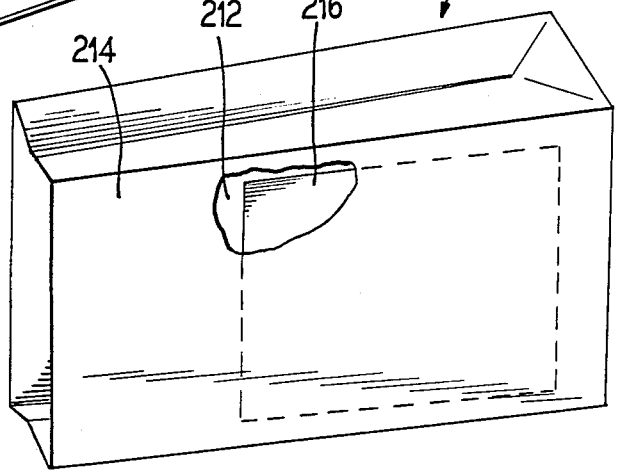
FIG. 7 is a perspective view, partially cut away, of a bag with a patch between inner and outer layers as manufactured by the bag forming apparatus of FIGS. 1 and 2.

In FIG. 7 is shown a product manufactured by a patch applicator 10 according to the present invention. The product is a bag 210 having an inner surface or liner 212, an outer surface 214, and a patch 216 disposed between the liner 212 and outer surface 214. The patch 216 is of a lesser extent than the bag 210 and has a predetermined size and location with respect to the finished bag 210. One application of the bag 210 is for use in microwave cooking, wherein the inner and outer bag material 212 and 214 are of a non-metallic substance and the patch 216 is of a metallic foil for absorbing microwave energy. The size and location of the patch with respect to the bag 210 is critical in such application to ensure proper cooking and avoid malfunctioning of the microwave cooking unit. A product contemplated for cooking within the bag 210 is microwave popcorn. It is also contemplated to utilize the patch applicator 10 of the present application to apply windows to envelopes and the like. Other uses are contemplated as well where a section of a web is to be applied to another web.

Figure 8:
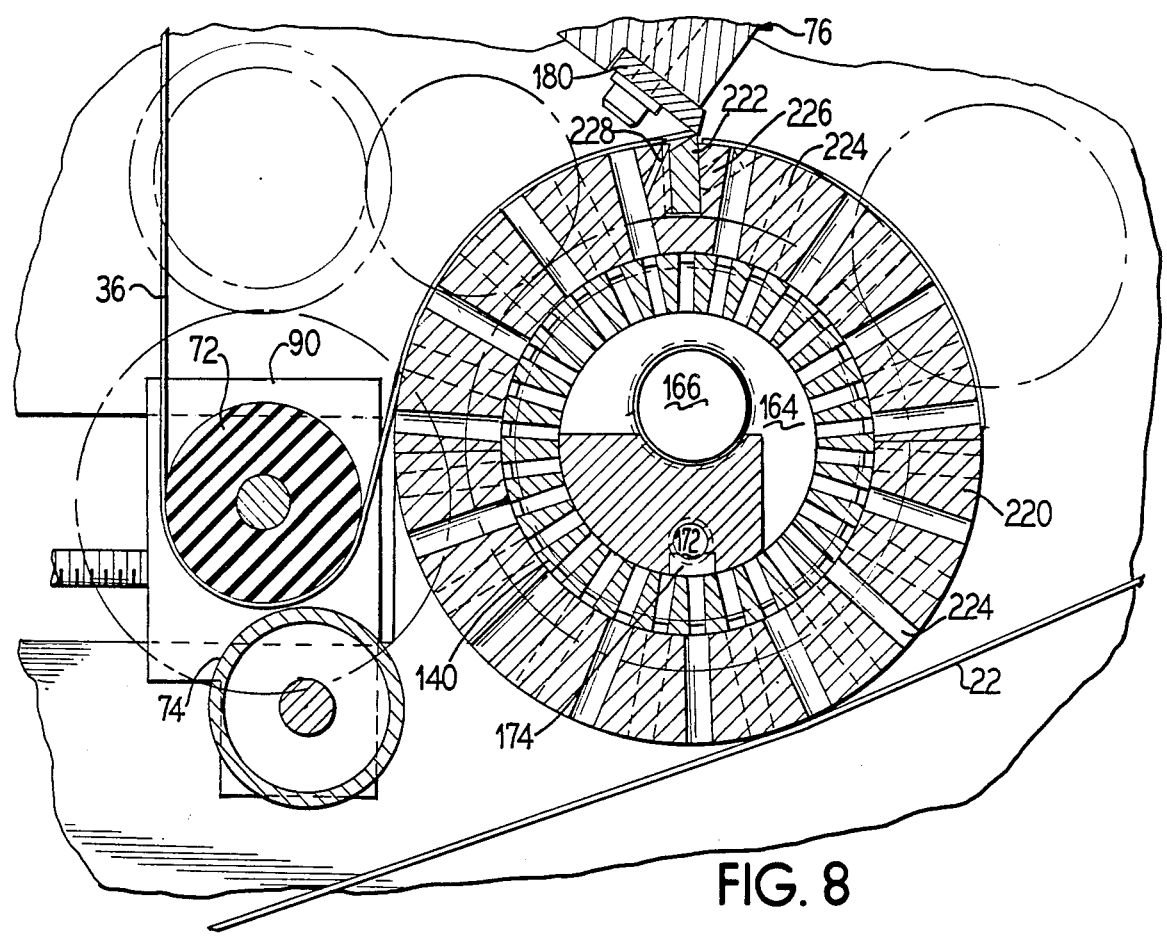
FIG. 8 is a cross section of a second embodiment of a vacuum cylinder of the present invention.

The present invention can be easily adapted for use with patches of different sizes or having different spacings along the web 22 than in the previously illustrated embodiment. This is accomplished by changing the feed rate of the pinch rollers 72 and 74 and/or by replacement of the perforate outer cylinder 142 with a perforate cylinder of a different outside diameter. The difference in outer diameter of the new cylinder is accommodated by adjusting the position of the blade 180, as well as by adjusting the positions of the pinch rollers 72 and 74, the rollers 64 and 66. As shown in FIG. 8, the perforate cylinder 142 has been replaced by a perforate cylinder 220 of a smaller outside diameter, which carries only a single blade 222. Air passage ways 224 are in communication with the slots 160 in the slotted cylinder 140, which in turn are in communication with the stationary core 150 just as in the previous embodiment. However, no nozzles are provided in the air passage ways 224 in the second embodiment. Just as before, the patch web material 36 is fed over the face of the perforate cylinder 220 at a rate slower than the rotation of the cylinder so that slippage of the web 36 on the cylinder 220 occurs. The web 36 is severed into individual patches 34 by the meeting of the blade 222, which is held in place by set screws 226, and the blade 180. Additional air passage ways 228 following the blade 222 are also included in the present embodiment.

Figure 9:
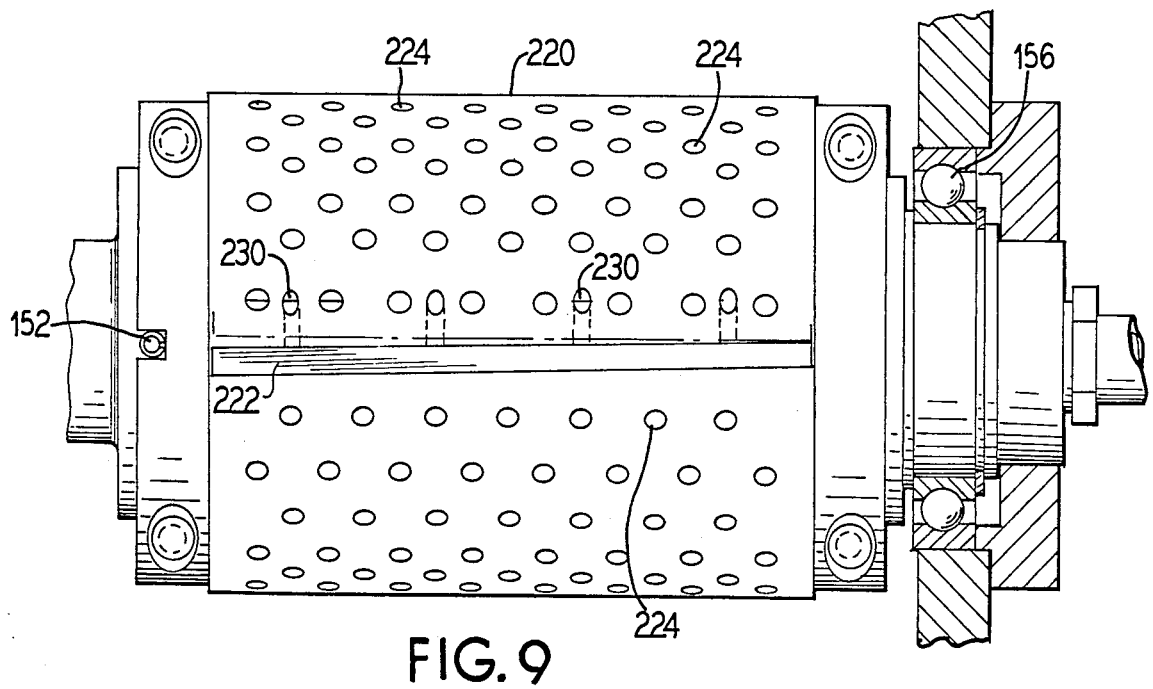
FIG. 9 is a plan view of the vacuum cylinder of FIG. 8.

With reference now to FIG. 9, the outermost surface of the perforate cylinder 220 is shown, including the air passage ways 224. The set screws 226 lie within channels 230 to hold the blade 222 in place. By comparing the position of the blade 222 to a broken line superimposed along the rotational axis of the cylinder 220, it can be seen that the blade 222 is at an angle thereto. This is to ensure efficient cutting of the web material 36 as the blades 220 and 180 encounter one another. The set screw 152 by which the perforate outer cylinders 142 and 220 are affixed to the slotted cylinder 140 can be seen.

Thus, there has been shown and described a patch applicator apparatus 10 for web material which cuts a predetermined size patch and accurately applies it to a predetermined location on a moving web 22 for accurate positioning of the patch within the final product. The present apparatus can be retrofit into existing bag making machinery, and can be utilized to make other products as well. The timing of the present web applicator in the bag making machinery is assured by a synchronizing linkage from a single drive motor to the web applicator, as well as to the bag forming station. The vacuum cylinder is synchronized with the rest of the system and the timely application of low and high pressure to the cut patches is assured by shaped cut outs in the stationary core mounted coaxilly within a pair of rotating cylinders. A photoelectric registration system can be utilized with the present invention for even greater accuracy.

The present invention utilizes a slotted sleeve within the perforate vacuum cylinder to permit changing to different sizes of outside cylinders without changing the inner cylinder and thus more easily utilizes common parts. The patch applicator itself creates the patches from a continuous web and deposits them on another continuous web. For better slippage of patch material over the surface of the vacuum roller, the outer surface thereof can be coated with a slippery compound.

Although other modifications and changes may be suggested by those skilled in the art, it is the intention of the inventors to embody within the patent warranted hereon all changes and modifications as reasonably and properly come within the scope of their contribution to the art.

I claim:

1. A patch applicator for cutting patches from a supply roll of patch material and applying the patches to a traveling web, comprising:
    a rotatable vacuum cylinder having an outer cylindrical surface abutting said traveling web and including:
        means for applying a low pressure air flow to a first arcuate portion of said outer cylindrical surface,
        means for applying a high pressure air flow to a second arcuate portion of said outer cylindrical surface to release patches that have been applied to the traveling web, and
        means for selectively changing said outer cylindrical surface of said rotatable vacuum cylinder for surfaces of different outside diameters including a first outer sleeve and a second inner sleeve coaxially and fixedly mounted with respect to one another, said first outer sleeve being removable and replaceable with outer sleeves of various outside diameters, said first outer sleeve having generally elongated radially extending air channels, said second inner sleeve having axially extending slots, said axially extending slots each having a generally double arcuate profile to provide communication between high pressure means and low pressure means of limited axial extent and said radially extending air channels over a greater axial extent;
        a stationary inner core disposed within said second inner sleeve;
    means for cutting patches of predetermined size from said supply roll, said cutting means cutting patches from the supply roll as the patch is against said first low pressure portion of said outer cylindrical surface so that a cut patch is carried on said first portion of said vacuum cylinder.

2. A patch applicator as claimed in claim 1, wherein said patch cutting means includes a first blade mounted extending generally axially along said outer cylindrical surface,
    at least one second blade mounted in said rotatable vacuum cylinder for periodic engagement with said first blade during rotation of said vacuum cylinder; and
    at least one of said first and second blades is mounted at an angle relative to an axis of said cylindrical outer surface.

* * * * *